US012784536B2

(12) United States Patent
Kim

(10) Patent No.: US 12,784,536 B2
(45) Date of Patent: Nov. 3, 2026

(54) SYSTEM AND METHOD FOR SUPPORTING REAL-TIME BASEBALL BETTING SERVICE

(71) Applicants: WELL LEARNING CO., LTD., Bucheon-si (KR); Myeong Seob Kim, Bucheon-si (KR)

(72) Inventor: Myeong Seob Kim, Bucheon-si (KR)

(73) Assignees: WELL LEARNING CO., LTD., bUCHEON-SI (KR); Myeong Seob Kim, Bucheon-si (KR)

( * ) Notice: Subject to any disclaimer, the term of this patent is extended or adjusted under 35 U.S.C. 154(b) by 273 days.

(21) Appl. No.: 18/672,849

(22) Filed: May 23, 2024

(65) Prior Publication Data

US 2024/0312300 A1 Sep. 19, 2024

Related U.S. Application Data

(63) Continuation of application No. PCT/KR2022/018644, filed on Sep. 23, 2022.

(30) Foreign Application Priority Data

Nov. 30, 2021 (KR) ........................ 10-2021-0168099
Jul. 7, 2022 (KR) ........................ 10-2022-0083749

(51) Int. Cl.
*G07F 17/32* (2006.01)
*G06Q 50/34* (2012.01)

(52) U.S. Cl.
CPC ......... *G07F 17/3225* (2013.01); *G06Q 50/34* (2013.01); *G07F 17/3288* (2013.01)

(58) Field of Classification Search
CPC ............................ G07F 17/3288; G06Q 50/34
See application file for complete search history.

(56) References Cited

U.S. PATENT DOCUMENTS

2003/0157976 A1* 8/2003 Simon .................... G06Q 50/34 463/1
2012/0214575 A1 8/2012 Amaitis et al.
(Continued)

FOREIGN PATENT DOCUMENTS

JP 2007-535385 A 12/2007
KR 10-2011-0003639 A 1/2011
(Continued)

OTHER PUBLICATIONS

International Search Report issued in PCT/KR2022/018644; mailed Mar. 14, 2023.
(Continued)

*Primary Examiner* — Lawrence S Galka
(74) *Attorney, Agent, or Firm* — Studebaker Brackett PLLC

(57) ABSTRACT

A system for providing a real-time baseball betting service according to an embodiment of the present invention, includes a user terminal for betting prescribed amounts of game money on prediction results of predictions of game events that occur in each inning of a baseball game that is broadcast live in real time, the bets being made using a real-time baseball betting service platform by using a preset amount of game money that is given for each game; and a baseball game betting service server that directly or indirectly allows and/or prevents the user terminal from participating in a betting process according to a preset game betting rule, and pays a prescribed reward to the user terminal on the basis of the accumulated sum value of the betting results obtained by participating in at least one of the events that occurred in each inning.

7 Claims, 7 Drawing Sheets

(56) References Cited

U.S. PATENT DOCUMENTS

| | | | | |
|---|---|---|---|---|
| 2013/0184039 | A1* | 7/2013 | Steir | A63F 13/828 463/1 |
| 2021/0104129 | A1 | 4/2021 | Srinivasan | |
| 2022/0122408 | A1* | 4/2022 | Huke | G07F 17/3213 |
| 2024/0005732 | A1* | 1/2024 | Lee | G07F 17/3288 |

FOREIGN PATENT DOCUMENTS

| | | | |
|---|---|---|---|
| KR | 10-2015-0119978 | A | 10/2015 |
| KR | 10-1555787 | B1 | 10/2015 |
| KR | 10-2016-0022840 | A | 3/2016 |
| KR | 10-1733886 | B1 | 5/2017 |

OTHER PUBLICATIONS

"Notice of Reasons for Refusal" Office Action issued in JP 2024-553274; mailed by the Japanese Patent Office on Apr. 1, 2025.

* cited by examiner

FIG. 5

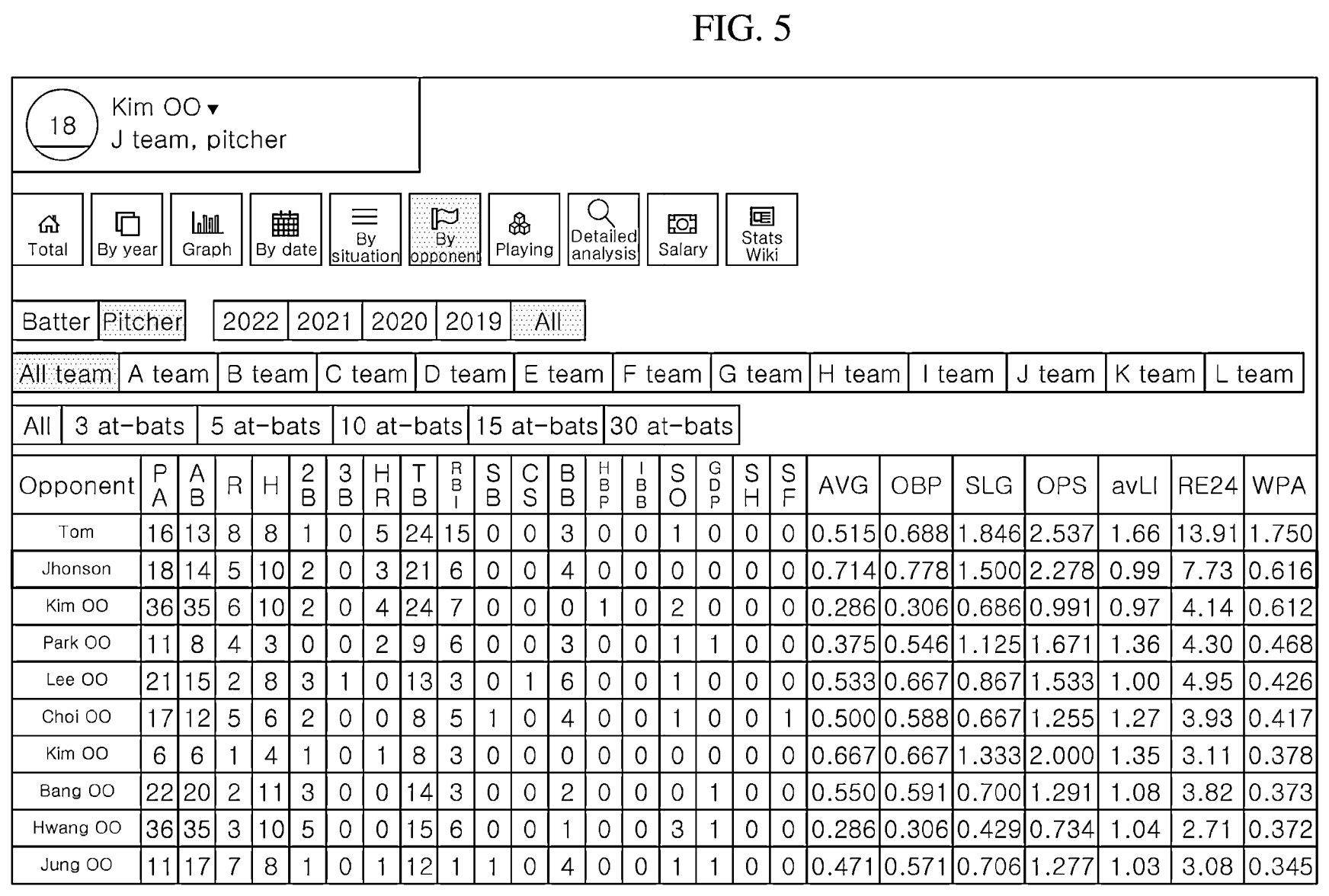

18 Kim OO ▾
J team, pitcher

Total | By year | Graph | By date | By situation | By opponent | Playing | Detailed analysis | Salary | Stats Wiki Batter | Pitcher 2022 | 2021 | 2020 | 2019 | All All team | A team | B team | C team | D team | E team | F team | G team | H team | I team | J team | K team | L team All | 3 at-bats | 5 at-bats | 10 at-bats | 15 at-bats | 30 at-bats

| Opponent | PA | AB | R | H | 2B | 3B | HR | TB | RBI | SB | CS | BB | HBP | IBB | SO | GDP | SH | SF | AVG | OBP | SLG | OPS | avLI | RE24 | WPA |
|---|---|---|---|---|---|---|---|---|---|---|---|---|---|---|---|---|---|---|---|---|---|---|---|---|---|
| Tom | 16 | 13 | 8 | 8 | 1 | 0 | 5 | 24 | 15 | 0 | 0 | 3 | 0 | 0 | 1 | 0 | 0 | 0 | 0.515 | 0.688 | 1.846 | 2.537 | 1.66 | 13.91 | 1.750 |
| Jhonson | 18 | 14 | 5 | 10 | 2 | 0 | 3 | 21 | 6 | 0 | 0 | 4 | 0 | 0 | 0 | 0 | 0 | 0 | 0.714 | 0.778 | 1.500 | 2.278 | 0.99 | 7.73 | 0.616 |
| Kim OO | 36 | 35 | 6 | 10 | 2 | 0 | 4 | 24 | 7 | 0 | 0 | 0 | 1 | 0 | 2 | 0 | 0 | 0 | 0.286 | 0.306 | 0.686 | 0.991 | 0.97 | 4.14 | 0.612 |
| Park OO | 11 | 8 | 4 | 3 | 0 | 0 | 2 | 9 | 6 | 0 | 0 | 3 | 0 | 0 | 1 | 1 | 0 | 0 | 0.375 | 0.546 | 1.125 | 1.671 | 1.36 | 4.30 | 0.468 |
| Lee OO | 21 | 15 | 2 | 8 | 3 | 1 | 0 | 13 | 3 | 0 | 1 | 6 | 0 | 0 | 1 | 0 | 0 | 0 | 0.533 | 0.667 | 0.867 | 1.533 | 1.00 | 4.95 | 0.426 |
| Choi OO | 17 | 12 | 5 | 6 | 2 | 0 | 0 | 8 | 5 | 1 | 0 | 4 | 0 | 0 | 1 | 0 | 0 | 1 | 0.500 | 0.588 | 0.667 | 1.255 | 1.27 | 3.93 | 0.417 |
| Kim OO | 6 | 6 | 1 | 4 | 1 | 0 | 1 | 8 | 3 | 0 | 0 | 0 | 0 | 0 | 0 | 0 | 0 | 0 | 0.667 | 0.667 | 1.333 | 2.000 | 1.35 | 3.11 | 0.378 |
| Bang OO | 22 | 20 | 2 | 11 | 3 | 0 | 0 | 14 | 3 | 0 | 0 | 2 | 0 | 0 | 0 | 1 | 0 | 0 | 0.550 | 0.591 | 0.700 | 1.291 | 1.08 | 3.82 | 0.373 |
| Hwang OO | 36 | 35 | 3 | 10 | 5 | 0 | 0 | 15 | 6 | 0 | 0 | 1 | 0 | 0 | 3 | 1 | 0 | 0 | 0.286 | 0.306 | 0.429 | 0.734 | 1.04 | 2.71 | 0.372 |
| Jung OO | 11 | 17 | 7 | 8 | 1 | 0 | 1 | 12 | 1 | 1 | 0 | 4 | 0 | 0 | 1 | 1 | 0 | 0 | 0.471 | 0.571 | 0.706 | 1.277 | 1.03 | 3.08 | 0.345 |

SYSTEM AND METHOD FOR SUPPORTING REAL-TIME BASEBALL BETTING SERVICE

CROSS-REFERENCE TO RELATED APPLICATIONS

The present application is a continuation of International Patent Application No. PCT/KR2022/018644, filed on Sep. 23, 2022, which is based upon and claims the benefit of priority to Korean Patent Application Nos. 10-2021-0168099 filed on Nov. 30, 2021 and 10-2022-0083749 filed on Jul. 7, 2022. The disclosures of the above-listed applications are hereby incorporated by reference herein in their entirety.

BACKGROUND

The present disclosure relates to a system and method for supporting a real-time baseball betting service in which individuals bet a certain number of points on pitchers, batters, and defensive players in each inning with a certain number of points given in advance and earn points based on subsequent situation or outcome to make a baseball game more fun and exciting while watching a professional baseball broadcast via a medium such as a TV, and a predetermined prize is awarded to the final high scorer.

In recent years, interest in sporting events has also increased as interest in leisure activities has increased. Generally, people enjoy sports events by visiting stadiums where sports events are held, or by listening to or watching broadcasting via media such as radio, television, and the Internet.

Many people also place bets on their favorite team or player, the expected outcome of a match, or the like and share dividends according to the outcome of the match to enhance their interest and enjoyment of sporting events.

As the number of people who enjoy watching and betting purely without gambling has increased, betting games such as 'TOTO' and 'PROTO' have been proposed that allow people to enjoy analyzing the game through their interest and participation in sports.

However, these conventional betting games have the limitation that they only encourage users to bet on sports events, but do not lead to active participation in sports events.

In other words, because in the case of 'TOTO' or 'PROTO', a user places a bet on the win/loss, goals scored/goals conceded in a match, the user's attention is focused on the match until the match starts, but once the match starts, it is no longer possible to bet on the match, so that the user's concentration is reduced, just like watching a match broadcast conventionally, and the user's attention is focused on receiving dividends according to the outcome of the match.

Furthermore, for those who do not have experience in analyzing the specific teams or players involved in a match, betting itself becomes a burden, which makes them hesitant to participate in betting games, resulting in apathy towards betting games.

Therefore, there is a need to increase the concentration and interest in a match from the beginning to the end by enabling betting on various situations (events) that occur during a sporting event, and to induce interest in betting by providing information that is available as a reference when betting even for participants who do not have experience in analyzing teams or specific players.

PRIOR ART LITERATURE

Patent Document

Registered Patent Publication No. 10-1555787

SUMMARY

To solve conventional problems, a purpose of the present disclosure is to provide a system and a method for supporting a real-time baseball betting service.

To solve the above problem, according to an embodiment, a system for supporting a real-time baseball betting service includes a user terminal that, via a real-time baseball betting service platform, bets a specified amount of game money on a predicted outcome of a game event occurring during each inning of a live broadcast baseball match using a predetermined amount of game money which is paid per match, and a baseball game betting service server that directly or indirectly allows and/or prevents the user terminal from participating in a betting process according to a preset game betting rule, and pays a predetermined reward to the user terminal based on a cumulative sum of results of betting in which the user terminal participates in at least one of the game events occurring during each inning.

In one embodiment, the baseball game betting service server may support game betting on one or more baseball match broadcasts currently being played and on possible game events in each inning of each baseball match, for each pitcher and each batter within a betting time. The betting time may be a time period from a time when a batter enters a batter's box to a time when the pitcher takes a set position to pitch (the pitcher places his axial foot facing the batter fully on or in front of a pitching plate, making contact with the pitching plate without separating from it, and then places his other foot in front of the pitching plate, holding a ball with both hands in front of his body, and completely stops moving for at least one second).

In one embodiment, the baseball game betting service server may recognize a batter batting only when any one of five batting conditions input by the user terminal is satisfied, and the five batting conditions include (1) a case where it is ruled safe by umpires at first base, (2) a case where it is ruled safe by umpires at second base, (3) a case where it is ruled safe by umpires at third base, (4) a case where a safe call for home run is made by umpires at home, (5) a case where base is not advanced and umpires call a player out.

In one embodiment, the baseball game betting service server may sum up betting points of participants who failed to bet among betting points on result of a batter's attack and then distribute summed betting points evenly.

In one embodiment, the baseball game betting service server may provide statistics on past matchups between a pitcher and a batter (winning percentage, batting average, or strikeout probability).

In one embodiment, the baseball game betting service server may support results of bets on results of defensive play of defensive players when a batter hits, and a reverse betting service may be a service that enables a user to bet on whether the betting probability of a plurality of betting participants is less than or equal to or is greater than or equal to a preset value.

According to an embodiment, a method for providing a real-time baseball betting service includes executing, by a user terminal, a real-time baseball game betting service platform and playing a desired baseball match video, displaying, by the user terminal, a result of a matchup between a pitcher and a batter for each inning and at least one game event about a defensive player, inputting, by the user terminal, preset betting points for at least one of game events related to a pitcher, batter, and defensive player for each inning under preset betting conditions, displaying, by the user terminal, betting results according to results of the game events related to the pitcher, the batter, and the defensive player, and, when the game results are over, summing up betting points for the betting results of a user's bets on the pitcher and batter for each inning and then paying a prize or reward corresponding to summed points.

According to an embodiment, the inputting of the preset betting points may include selecting, by the user terminal, a reverse betting service that enables the user to bet on whether the betting probability of a plurality of betting participants is less than or equal to or is greater than or equal to a preset value.

According to an embodiment, the preset betting conditions may be 'betting time' for selecting a game event and 'type of game event'. The betting time may be a time period from a time when a current batter strikes out or leaves the batter's box to a time when a next batter in order enters the batter's box.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 3 and 4 are examples of execution screens of the real-time baseball game betting service platform shown in FIG. 1, wherein

FIG. 5 is an illustrative diagram of statistics of past matchups between a pitcher and a batter, supported by the AI historical statistics interface shown in FIG. 3.

DETAILED DESCRIPTION

Figure 1:
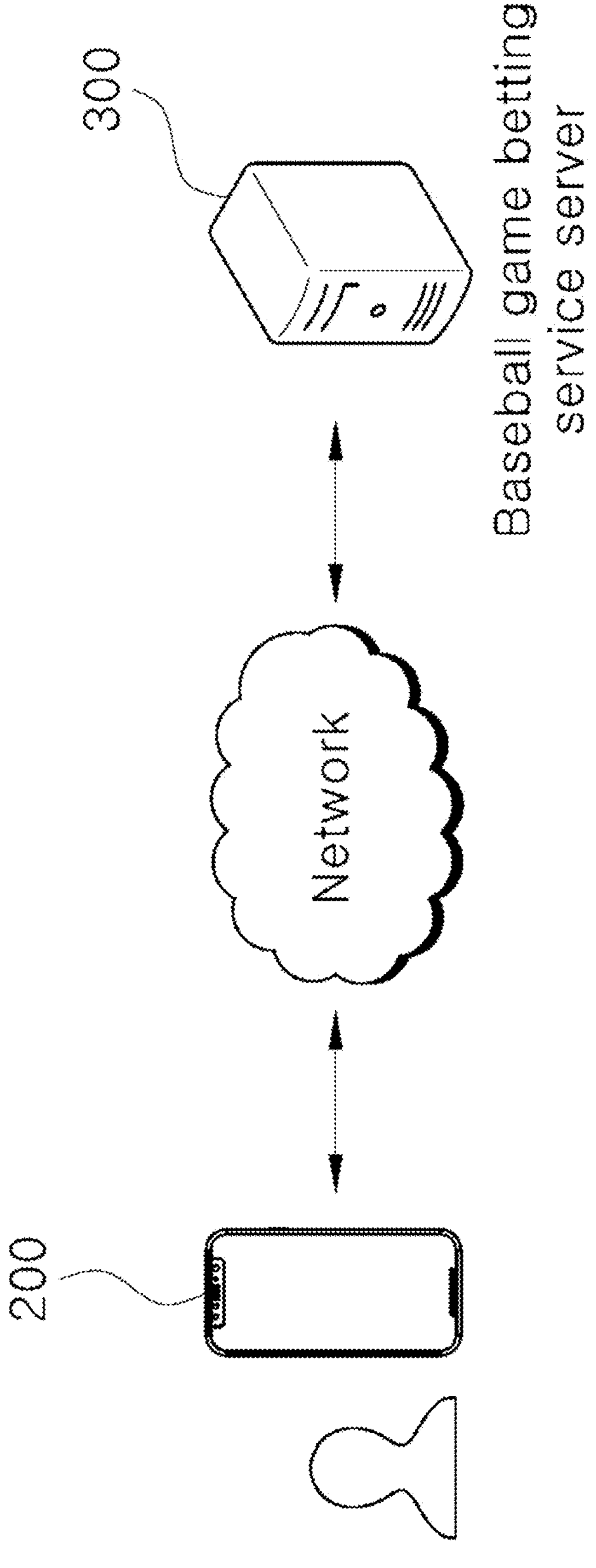
FIG. 1 is a network configuration diagram of a real-time baseball betting service providing system according to an embodiment of the present disclosure.

Hereinafter, with reference to the accompanying drawings, embodiments of the present disclosure will be described in detail such that those of ordinary skill in the art can easily carry out the present disclosure. However, the present invention may be embodied in many different forms and should not be construed as limited to the embodiments set forth herein. In order to clearly illustrate the disclosure in the drawings, parts not pertinent to the description have been omitted, and like reference numerals refer to like elements throughout the specification.

Throughout the specification, when an element is referred to as being "connected" to another element, it can be directly connected to the other element, or can be electrically connected to the other element with intervening elements interposed therebetween. In addition, when a part is said to "include" a certain component, this means that it may further include other components, rather than excluding other components, unless specifically stated to the contrary and it should be understood that this does not exclude in advance the presence or addition of one or more other features, numbers, steps, operations, components, parts, or combinations thereof.

The terms "about", "substantially", or the like used throughout the specification are used to mean at or close to the numerical value when manufacturing and material tolerances inherent in the stated meaning are presented, and are used to enhance the understanding of the present invention. Precise or absolute figures are used to assist in preventing unscrupulous infringers from taking unfair advantage of stated disclosures. Throughout the specification, the term "step of" does not mean "step for".

Throughout the specification, the term "unit" includes a unit realized by hardware, a unit realized by software, and a unit realized using both hardware and software. As examples only, one unit may be implemented by two or more pieces of hardware or two or more units may be implemented by one piece of hardware. Meanwhile, '~unit' is not limited to software or hardware, and "~ unit" may be configured to reside in an addressable storage medium or may be configured to reproduce one or more processors. As an example, '~ unit' may include components such as software components, object-oriented software components, class components and task components, processes, functions, properties, procedures, sub-routines, segments of program codes, drivers, firmware, microcodes, circuitry, data, databases, data structures, tables, arrays, and variables. Components and functionality provided within 'units' may be combined into a smaller number of components and be further divided into additional components and 'units'. In addition, the components and 'units' may be implemented to regenerate one or more CPUs within a device or secure multimedia card.

As used herein, some of the operations or functions described to be performed by a terminal or a device may be, instead of the terminal or the device, performed by a server connected with the terminal or the device. Likewise, some of the operations or the functions described to be performed by a server may be performed by a terminal or a device connected with the server, instead of the server.

As used herein, some of the operations or functions described to be mapped or matched with a terminal may be interpreted as mapping or matching the unique number of the terminal, which is identification information about the terminal, or personal identification information.

Hereinafter, systems and methods that support a method of providing real-time baseball betting services according to an embodiment of the present disclosure will be described in more detail with reference to the drawings.

Figure 2:
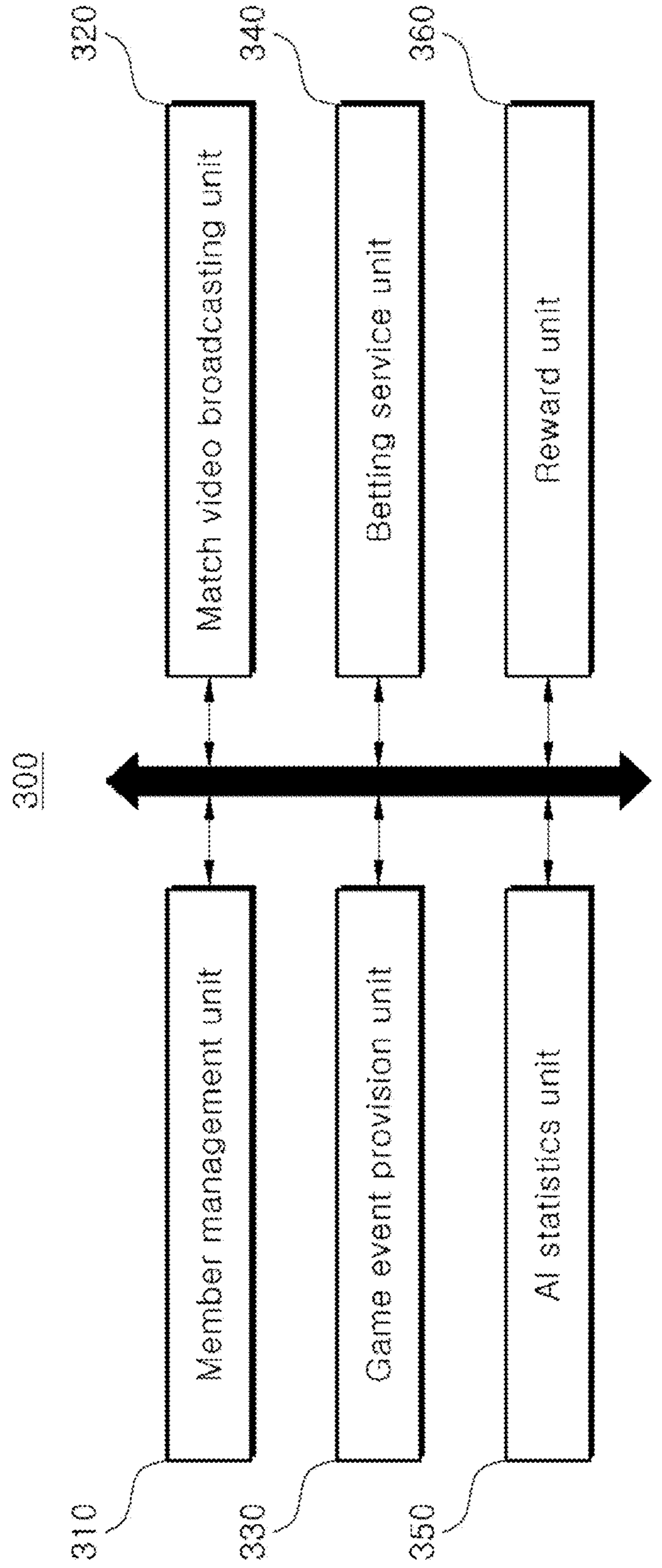
FIG. 2 is a detailed configuration diagram of a baseball game betting service server shown in FIG. 1.
Figure 3:
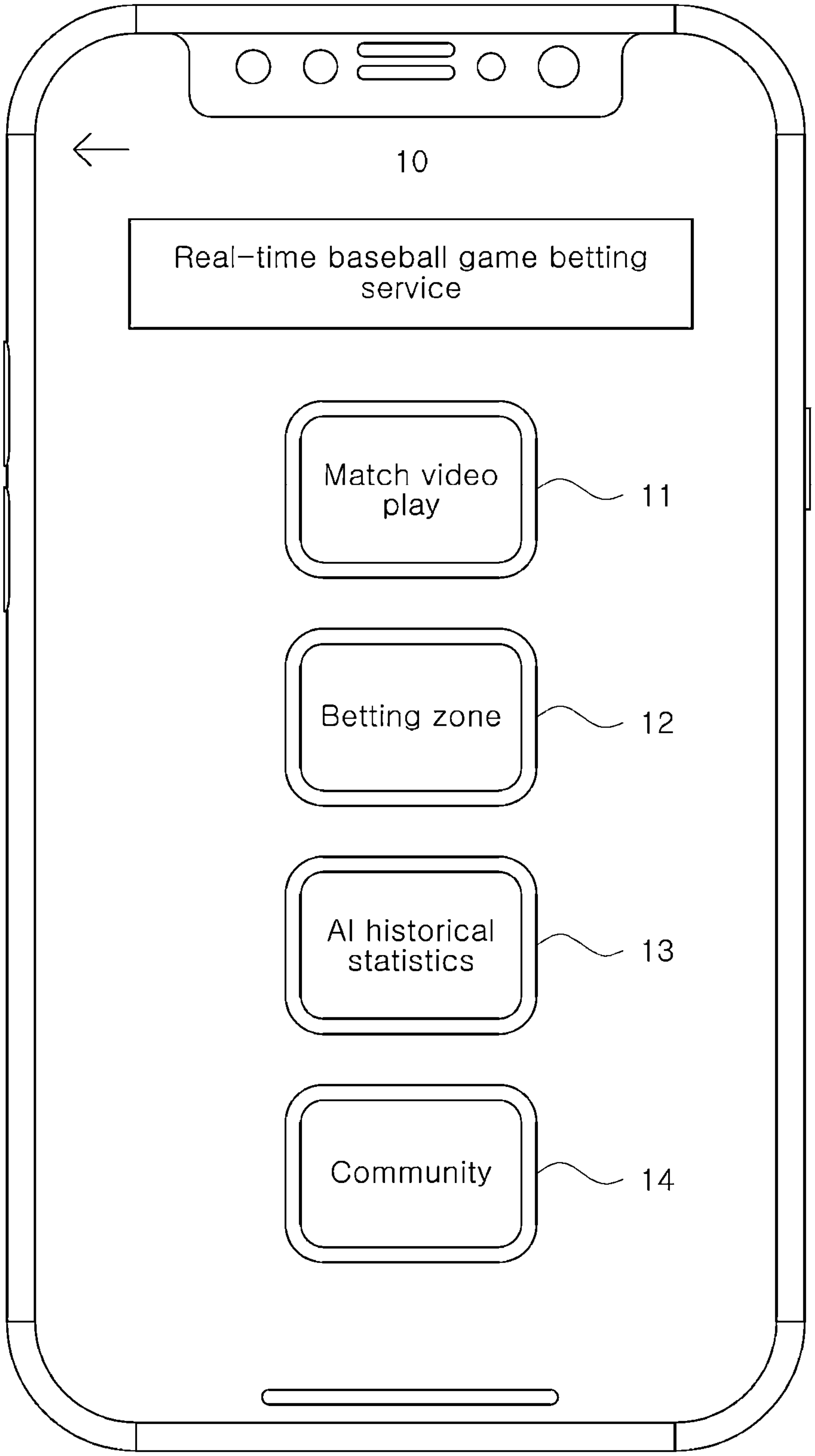
Figure 4A:
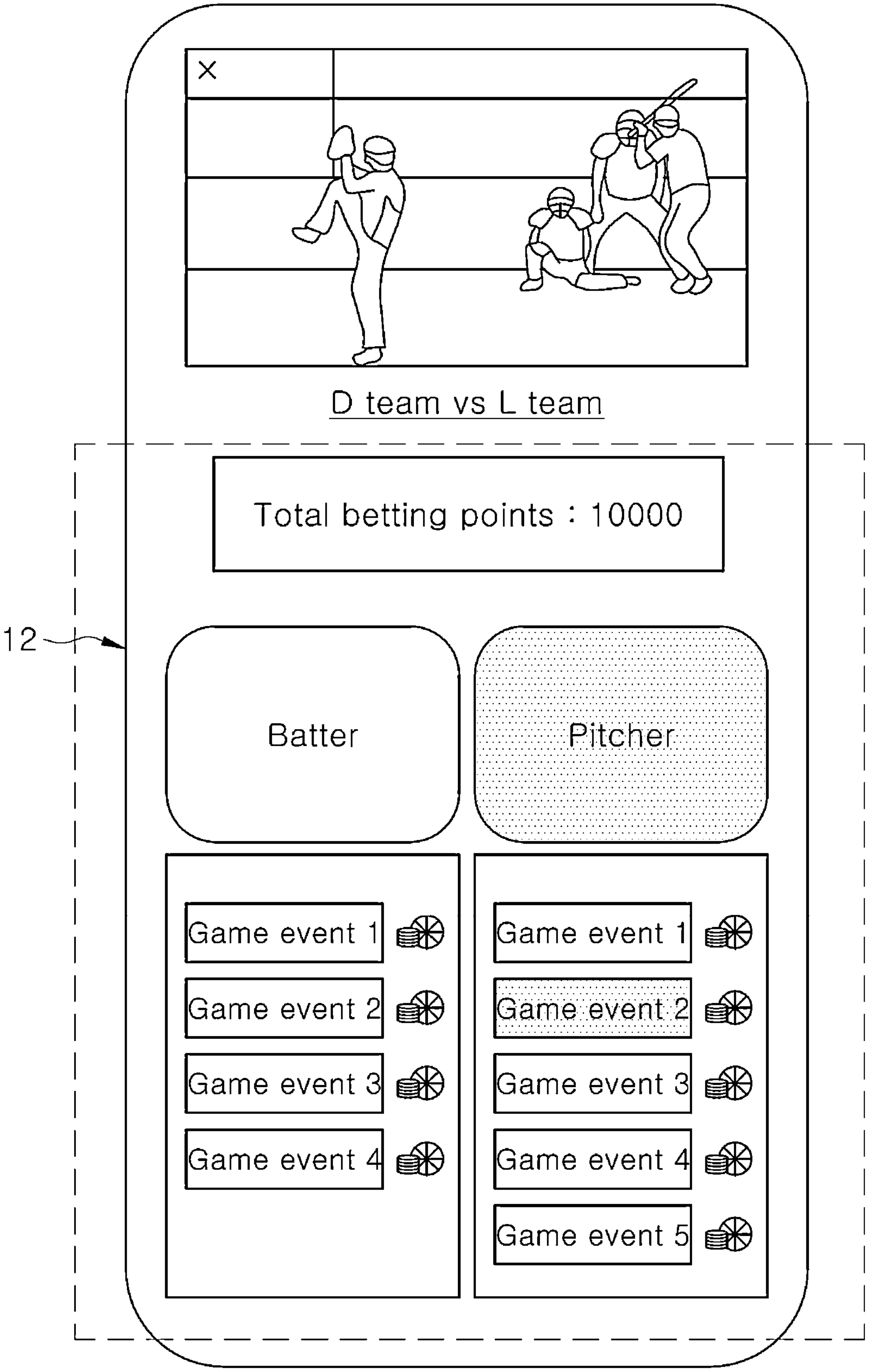
FIG. 4A is an interface for betting on the outcome of a matchup between a batter and a pitcher (predicting the outcome of a game event)
Figure 4B:
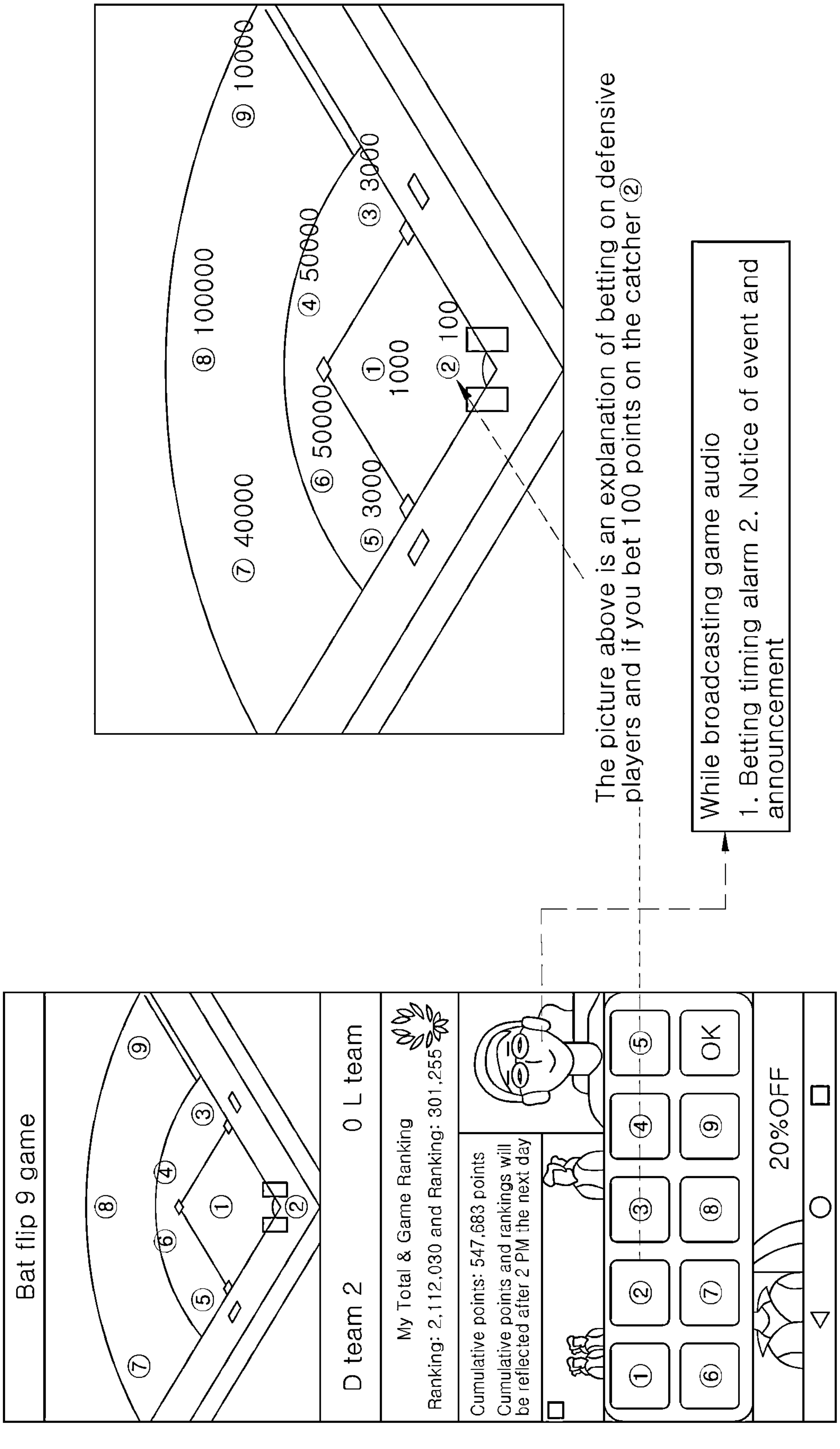
FIG. 4B is an interface for betting on a game event of a defensive player.

FIG. 1 is a network configuration diagram of a real-time baseball betting service providing system according to an embodiment of the present disclosure, FIG. 2 is a detailed configuration diagram of a baseball game betting service server shown in FIG. 1, FIGS. 3 and 4 are examples of execution screens of the real-time baseball game betting service platform shown in FIG. 1, wherein FIG. 4A is an interface for betting on the outcome of a matchup between a batter and a pitcher (predicting the outcome of a game event), and FIG. 4B is an interface for betting on a game event of a defensive player. FIG. 5 is an illustrative diagram of statistics of past matchups between a pitcher and a batter, supported by the AI historical statistics interface shown in FIG. 3

First, as shown in FIG. 1, a system 100 supporting a method for providing a real-time baseball betting service according to an embodiment of the present disclosure may include a user terminal 200 and a baseball game betting service server 300.

When the components communicate via a network, the network may refer to a connection structure that enables information exchange between nodes such as a plurality of terminals and servers, and examples of the network may include a local area network (LAN), a wide area network (WAN), the Internet (WWW), a wired or wireless data communication network, a telephone network, a wired or wireless television communication network, and/or the like. Examples of wireless data communication networks may include, but not limited thereto, 3G, 4G, 5G, 3GPP (3rd Generation Partnership Project), 5GPP (5th Generation Partnership Project), LTE (Long Term Evolution), WIMAX (World Interoperability for Microwave Access), Wi-Fi, Internet, LAN (Local Area Network), Wireless LAN, WAN (Wide Area Network), PAN (Personal Area Network), RF (Radio Frequency), Bluetooth network, NFC (Near-Field Communication) network, satellite broadcasting network, analogue broadcasting network, DMB (Digital Multimedia Broadcasting) network, and/or the like.

In addition, the term "at least one" is defined as a term including singular and plural, and although the term "at least one" does not exist, it is apparent that each component may exist in a singular or plural form, and may mean singular or plural. In addition, that each component is provided in singular or plural may be changed according to embodiments.

The user terminal 200 may be a terminal that receives a password when inputting a unique number (ID) of the terminal to use the service after registering for a predetermined paid membership to use the real-time baseball game betting service supported by the baseball game betting service server 300 to be described hereinafter.

In this case, the real-time baseball game betting service is a paid service, and since the service is provided for each league in the first half and the second half, the user needs to apply for the paid service for each of the first half and the second half. Therefore, different passwords may be given for subscriptions of paid services in the first half and the second half.

Meanwhile, the user terminal 200 may receive, via a real-time baseball game betting service platform 10 provided by the baseball game betting service server 300, a prediction of the outcome of an ongoing baseball game (e.g., a prediction of a win, a draw, a loss, etc.), a prediction of the event of a matchup between a pitcher and a batter in the current inning of a plurality of innings into which a game is divided (e.g., for example, a prediction of the number of strikeouts, flies, bases on balls, dead balls, hits, home runs, etc.), and a betting amount (e.g., real or cyber money, points, etc.) for the prediction, and transmit betting request information to the baseball game betting service server 300.

In addition, the user terminal 200 may place a bet on a prediction of a game event occurring in the current matchup between pitcher-batter in each inning.

The game events may be events that occur in the matchup between a pitcher and a batter during the course of the game and may include, for example, a strike out, a bunt, a fly, a four-ball, a hit by pitch, a hit, a double play, a home run, a balk by the pitcher, and/or the like, and may further include a steal by a base runner and/or the like in addition thereto.

It should be noted that the types of game events mentioned are not limited to the above examples, and events may include a variety of events that may occur during the course of a game, according to embodiments.

Furthermore, events that are not directly caused by the current pitcher and batter, such as the stealing of a base runner, may also be understood to be included within the scope of the above events as the events may occur during the current pitcher-batter matchup.

The betting participant may select one or more game events on which the betting participant wishes to place a bet from among bettable events of the current pitcher-batter matchup displayed on the screen of the user terminal 200 in the current inning.

For example, 'strikeout, bunt, fly, four-ball, dead ball, hit, double play, home run, balk, and stolen base' may be displayed as bettable events in the current inning, and the betting participant may select strikeout, four-ball, and stolen base as betting events among them.

In this case, the 'betting time' for selecting a betting event may be a time period from a time when the current batter strikes out or leaves the batter's box to a time when the next batter come to the batter's box, and the 'game time' for monitoring a betting result after the betting time has elapsed may be a time period from the time when the current batter comes to the batter's box to a time when the batter leaves the batter's box.

Thus, a betting participant may have multiple betting opportunities during the current inning.

Furthermore, the game events described herein may be further categorized.

For example, a fly may be categorized as an infield fly, a sacrifice fly, a foul fly, a simple fly, and the like, and a hit may be categorized as a hit to the left, a (a hit to the right), a hit to the center, a double, a triple, and so on. In addition, strikeouts, four-balls, and dead balls may be categorized per inning and per game.

Note that a betting participant may select only a betting event in the current inning or select an item along with a betting event.

If an item is selected along with a betting event, the betting participant may have an opportunity to select multiple items during the current inning.

The selectable items may be limited to bettable events, betting events, and specific occurring types of events other than the bettable events and the betting events.

On the other hand, the dividend for the betting may be paid if one of the betting events selected by the betting participant in the current pitcher-batter matchup actually occurs for the first time.

For example, when the betting events selected for the current pitcher-batter matchup includes a "dead ball" and the "dead ball" is the first actual occurrence in the current pitcher-batter matchup, the dividend for a relevant betting may be paid out.

In addition, if there are multiple betting events selected for the current pitcher-batter matchup, and at least one of the multiple betting events matches the event that actually occurred, a dividend may be provided for each betting.

For example, if betting events selected for the current pitcher-batter matchup are "strikeout, fly, dead ball, hit, and stolen base," and events that actually occurred are "strikeout, dead ball, hit, and balk," dividends may be made on the plurality of betting events "strikeout, dead ball, and hit" that were hit.

Furthermore, the user terminal 200 may be a terminal for placing bets on game events of defensive players for a result of battering of a batter.

In this case, the game events of defensive players may include whether the pitcher, the catcher, the first baseman, the second baseman, the third baseman, the shortstop, the left fielder, the center fielder, or the right fielder plays stably in defense of the ball hit to the his direction, and the user terminal 200 may be a terminal that places a bet on any one of the pitcher, catcher, first baseman, second baseman, third baseman, shortstop, left fielder, center fielder, and right fielder with a certain number of points at each at-bat.

For example, a user may bet on a defensive player who first catches a hit or bunted ball, including a foul fly ball, to get the batter out, or catches and throws or tosses the ball to a fellow defensive player, in response to the batter's batting, from among nine defensive players including the pitcher. If the batter's hit is a home run, or if the batter strikes out or strikes out on a wild swing, the result of the user's betting will be considered as a "lose".

Note that the bet on the defensive player may be intended to bet on the batter when the team supported by the user (individual or group) is on offense and the defensive player when the team is on defense, and also for inter-individual or team tournament betting games in group betting games.

Further, the user terminal 200 may be configured to receive a list of prizes corresponding to cumulative betting points after the game ends, and to provide a prize winner address for receiving one of the prizes.

Further, the user terminal 200 may be provided with AI predictive betting statistics via the real-time baseball game betting service platform 10.

The AI predictive betting statistics may be "statistical information" to which a betting participant is able to refer to increase their hit rate when selecting a betting event in the current pitcher-batter matchup.

For example, in the current inning, if Pitcher A is on the mound and Batter B is on the batter's box, the AI may provide statistical information on the matchup between Pitcher A and Batter B at a request from a betting participant.

The "statistical information" may include one or more of a statistical value and a predictive value for the current pitcher-batter matchup, the statistical value may be calculated based on one or more of past match data for the home team, the away team, the players of each team participating in the matchup, and past match data for the current pitcher-batter matchup, and the predictive value may be calculated based on one or more of the number of past betting hits by betting participants, the number of current bets by betting participants, and past match data for events (items) occurring in the current pitcher-batter matchup.

Further, the user terminal 200 may be a terminal supported by the real-time baseball game betting service platform 10 to receive betting participation rates of betting participants, hit rates of betting participants, number of betting participants, or/and the like.

In addition, the user terminal 200 may be a terminal in which a reverse betting service is supported by the real-time baseball game betting service platform 10, and a more detailed description of the reverse betting service will be described later.

In addition, the user terminal 200 may be a terminal that supports one or more of the following inquiry services for each game event via the real-time baseball game betting service platform 10: the total amount bet, the amount bet by the user, the the total amount bet on the side the user bet on, the odds, the dividend amount in case of a hit, and the total amount bet on the side the user did not bet on.

In the following, the features of the real-time baseball game betting service platform proposed by the present disclosure will be briefly described.

First, the real-time baseball game betting service platform 10 may include a game video play interface 11, a betting zone interface 12, an AI historical statistics interface 13, and a community interface 14.

The game video play interface 11 may be configured to play and record a baseball game video of each stadium being broadcast live in real time from an external server.

The game video play interface 11 may provide a function to automatically record innings on which a betting participant places a bet via the betting zone interface 12, and screen capture and also store important scenes in the inning in which a betting hit has occurred.

For example, if a betting participant bets on the second batter for a game event called "Four-Ball" in the bottom of the first inning, the game video play interface 11 may automatically capture a video in which the catcher has caught four balls which is a four-ball.

Alternatively, if a betting participant places a bet on a game event called "Dead Ball by batter" in the bottom of the first inning, the game video play interface 11 may automatically capture a video in which the ball has hit the batter's body.

The betting zone interface 12 may be a GUI interface for allowing a user to specify game events, which are events that occur in a pitcher-batter matchup during each inning, and input betting points to be wagered on the specified game events.

The game events may be events that occur in the matchup between a pitcher and a batter during the course of the game and may include, for example, a strikeout, a bunt, a fly, a four-ball, a hit by pitch, a hit, a double play, a home run, a balk by the pitcher, and/or the like, and may further include a steal by a base runner and/or the like in addition thereto.

It should be noted that the types of game events mentioned are not limited to the above examples, and events may include a variety of events that may occur during the course of a game, according to embodiments.

Furthermore, events that are not directly caused by the current pitcher and batter, such as the stealing of a base runner, may also be understood to be included within the scope of the above events as the events may occur during the current pitcher-batter matchup.

The betting participant may select one or more game events on which the betting participant wishes to place a bet from among betting events of the current pitcher-batter matchup displayed on the screen of the user terminal 200 in the current inning.

For example, 'strikeout, bunt, fly, four-ball, dead ball, hit, double play, home run, balk, and stolen base' may be displayed as bettable events in the current inning, and the betting participant may select strikeout, four-ball, and stolen base as betting events among them.

In this case, the 'betting time' for selecting the game event may be a time period from a time when the current batter strikes out or leaves the batter's box to a time when the next batter come to the batter's box, and the 'game time' for monitoring a betting result after the betting time has elapsed may be a time period from the time when the current batter comes to the batter's box to a time when the batter leaves the batter's box.

Thus, a betting participant may have multiple betting opportunities during the current inning.

Furthermore, the game events described herein may be further categorized.

For example, a fly may be categorized as an infield fly, a sacrifice fly, a foul fly, a simple fly, and the like, and a hit may be categorized as a hit to the left, a hit to the right, a hit to the center, a double, a triple, and so on. In addition, strikeouts, four-balls, and dead balls may be categorized per inning and per game.

Note that betting participants may select only betting events in the current inning or select items along with betting events.

The selectable items may be limited to bettable events, betting events, and specific occurring types of events other than the bettable events and the betting events.

That is, if the selectable item is dependent on bettable events, the user terminal 200 may display the selectable game events limited to the specific occurring types of the bettable events.

Furthermore, the betting zone interface 12 may also support zone-based betting based on the location of a batted ball, by specifying areas of stadium, such as the type of hit by a batter, for example, left/center/right single, left/center/right double, left/center/right triple, left/center/right home run, and/or the like.

In addition, the betting zone interface 12 may be an interface which supports displaying one or more of available betting points for a relevant match, lowest/highest available betting points per inning, the total amount bet for each game event, the amount bet by the user, the the total amount bet on the side the user bet on, the odds, the dividend amount in case of a hit, the total amount bet on the side the user did not bet on and the odds.

Furthermore, the betting zone interface 12 may be an interface that supports betting on game events of defensive players for a result of battering of a batter.

In this case, the game events of defensive players may include whether the pitcher, the catcher, the first baseman, the second baseman, the third baseman, the shortstop, the left fielder, the center fielder, or the right fielder plays stably in defense of the ball hit to the his direction, and the betting zone interface 12 may support allowing a user to place a bet on any one of the pitcher, catcher, first baseman, second baseman, third baseman, shortstop, left fielder, center fielder, and right fielder with a certain number of points at each at-bat.

For example, a user may bet on a defensive player who first catches a hit or bunted ball, including a foul fly ball, to get the batter out, or catches and throws or tosses the ball to a fellow defensive player, in response to the batter's batting, from among nine defensive players including the pitcher. If the batter's hit is a home run, or if the batter strikes out or strikes out on a wild swing, the result of the user's betting will be considered as a "lose".

Note that the bet on the defensive player may be intended to bet on the batter when the team supported by the user (individual or group) is on offense and the defensive player when the team is on defense, and also for inter-individual or team tournament betting games in group betting games.

Further, the betting zone interface 12 may an interface which supports displaying a betting participation rate of betting participants, hit rates of betting participants, and a number of betting participants.

Next, the AI historical statistical interface 13 may be an interface that supports statistical values and predictive values for the pitcher-batter matchup for each inning.

For example, in the current inning, if Pitcher A is on the mound and Batter B is on the batter's box, the AI may provide statistical information on the matchup between Pitcher A and Batter B at a request from a betting participant.

The "statistical information" may include one or more of a statistical value and a predictive value for the current pitcher-batter matchup, the statistical value may be calculated based on one or more of past match data for the home team, the away team, the players of each team participating in the matchup, and past match data for the current pitcher-batter matchup, and the predictive value may be calculated based on one or more of the number of past betting hits by betting participants, the number of current bets by betting participants, and past match data for events (items) occurring in the current pitcher-batter matchup.

The community interface 14 may be an interface that enables chatting among betting participants.

Meanwhile, the real-time baseball game betting service platform 10 may be an application, a program, an app page, a web page, or the like, and a web browser may refer to a program that enables the use of a web (WWW) service to receive and display hypertext described in hyper text markup language (HTML), and include, for example, Netscape, Explorer, chrome, and/or the like. Also, the application refers to an application on a device and may include, for example, an app running on a mobile terminal (e.g., a smartphone). The app may be downloaded from an application market, which is a virtual marketplace where mobile content is freely bought and sold and and then installed.

Next, the baseball game betting service server 300 may be configured to directly or indirectly intervene and/or restrain the betting process of the user terminal according to preset game betting rules, and to pay a predetermined reward to the user terminal based on a cumulative sum of the results of betting in which the user terminal participates in at least one of the game events occurring during each inning.

More specifically, the baseball game betting service server 300 may include a member management unit 310, a match video broadcasting unit 320, a game event provision unit 330, a betting service unit 340, an AI statistics unit 350, and a reward unit 360.

The member management unit 310 may be configured to manage members using the real-time baseball game betting service platform 10.

The member management unit 310 may be configured to provide guidance on the membership process required to subscribe to the real-time baseball game betting service, which is paid for by first and second halves, and to assign an ID and/or password for each member to participate in betting.

The match video broadcasting unit 320 may be configured to receive live baseball game images transmitted by each broadcaster and transmit the live baseball game images to a user terminal.

The match video broadcasting unit 320 may be configured to operate in conjunction with the betting service unit 340 described later and automatically record and/or script a match video at the time when a betting result is reflected for the game event occurring between a pitcher and a batter in each inning on the user terminal 200.

For reference, the match video broadcasting unit 320 may determine the outcome of the game event based on detecting an object in the baseball match video, such as a ball, a gesture of an umpire, and/or the like.

In addition, the match video broadcasting unit 320 may determine whether a hit has been made through screen switching, and determine the details of the game event (single, double, triple, home run, or the like) based on the position of the object detected on the screen, and record and capture the video at the time of determining the occurrence of a hit.

Next, the game event provision unit 330 may, at a request of the user terminal 200, provide the user terminal 200 with information about an upcoming match or a match currently in progress (e.g., the date of the match, the names of the home and away teams, the current score, and/or the like) and game events that may occur in the matchup between a pitcher and a batter in each inning.

The game events may be events that occur in the matchup between a pitcher and a batter during the course of the game and may include, for example, a strike out, a bunt, a fly, a four-ball, a hit by pitch, a hit, a double play, a home run, a balk by the pitcher, and/or the like, and may further include a steal by a base runner and/or the like in addition thereto.

It should be noted that the types of game events mentioned are not limited to the above examples, and events may include a variety of events that may occur during the course of a game, according to embodiments.

Furthermore, events that are not directly caused by the current pitcher and batter, such as the stealing of a base runner, may also be understood to be included within the scope of the above events as the events may occur during the current pitcher-batter matchup.

The betting participant may select one or more game events on which the betting participant wishes to place a bet from among bettable events of the current pitcher-batter matchup displayed on the screen of the user terminal 200 in the current inning.

For example, 'strikeout, bunt, fly, four ball, dead ball, hit, double play, home run, balk, and stolen base' may be displayed as bettable events in the current inning, and the betting participant may select strikeout, four-ball, and stolen base as betting events among them.

Furthermore, the game events described herein may be further categorized.

For example, a fly may be categorized as an infield fly, a sacrifice fly, a foul fly, a simple fly, and the like, and a hit may be categorized as a hit to the left, a hit to the right, a hit to the center, a double, a triple, and so on. In addition, strikeouts, four-balls, and dead balls may be categorized per inning and per game.

Next, the betting service unit 340 may support a function required for betting participants to place bets on game events that are the outcome of a matchup between a pitcher and a batter in each inning.

For each game, the betting service unit 340 may set and notify betting participants of the number of betting points available for betting on a match, the number of betting points available for betting on a pitcher and/or a batter in each inning, and determine that only betting information that meets preset betting conditions is valid.

The betting conditions may be 'betting time' for selecting a game event and 'type of game event', and the 'betting time' may be a time period from a time when the current batter strikes out or leaves the batter's box to a time when the next batter come to the batter's box, and the 'game time' for monitoring a betting result after the betting time has elapsed may be a time period from the time when the current batter comes to the batter's box to a time when the batter leaves the batter's box.

Furthermore, 'types of game events' may include, as the result of a batter's attack, five instances; (1) when it is ruled safe by the umpire at first base, (2) when it is ruled safe by the umpire at second base, (3) when it is ruled safe by the umpire at third base, (4) when a safe call for home run is made by the umpire at home, (5) when the base is not advanced and the umpire calls the player out, the game event betting on the batter being limited to the 5 cases, and in the present disclosure, the conditions mentioned are only examples and may be added or subtracted depending on the situation.

The betting service unit 340 may be the betting zone interface 12 that is a GUI interface for allowing a user to specify game events, which are events that occur in a pitcher-batter matchup during each inning, and input betting points to be wagered on the specified game events.

Herein, the betting zone interface 12 may also support zone-based betting based on the location of a batted ball, by specifying areas of stadium, such as the type of hit by a batter, for example, left/center/right single, left/center/right double, left/center/right triple, left/center/right home run, and/or the like.

Furthermore, the betting zone interface 12 may be an interface that supports betting on game events of defensive players for a result of battering of a batter.

In this case, the game events of defensive players may include whether the pitcher, the catcher, the first baseman, the second baseman, the third baseman, the shortstop, the left fielder, the center fielder, or the right fielder plays stably in defense of the ball hit to the his direction, and the betting zone interface 12 may provide support to enable a user to place a bet on any one of the pitcher, catcher, first baseman, second baseman, third baseman, shortstop, left fielder, center fielder, and right fielder with a certain number of points at each at-bat.

For example, a user may bet on a defensive player who first catches a hit or bunted ball, including a foul fly ball, to get the batter out, or catches and throws or tosses the ball to a fellow defensive player, in response to the batter's batting, from among nine defensive players including the pitcher. If the batter's hit is a home run, or if the batter strikes out or strikes out on a wild swing, the result of the user's betting will be considered as a "lose".

Note that the bet on the defensive player may be intended to bet on the batter when the team supported by the user (individual or group) is on offense and the defensive player when the team is on defense, and also for inter-individual or team tournament betting games in group betting games.

In addition, the betting zone interface 12 may be an interface which supports displaying one or more of available betting points for a relevant match, lowest/highest available betting points per inning, the total amount bet for each game event, the amount bet by the user, the the total amount bet on the side the user bet on, the odds, the dividend amount in case of a hit, and the total amount bet on the side the user did not bet on.

Further, the betting zone interface 12 may an interface which supports displaying a betting participation rate of betting participants, hit rates of betting participants, and a number of betting participants.

Further, the betting zone interface 12 may support a reverse betting service, wherein the reverse betting service may be a service for betting on whether the betting probability of a plurality of betting participants is less than or equal to or greater than or equal to a preset value.

Next, the AI statistics unit 350 may be configured to provide AI predictive betting statistics for predicting a game event, which is the outcome of a matchup between a pitcher and a batter, based on the past matchup between the pitcher and the batter.

The AI predictive betting statistics may be "statistical information" to which a betting participant is able to refer to increase their hit rate when selecting a betting event in the current pitcher-batter matchup.

For example, in the current inning, if Pitcher A is on the mound and Batter B is on the batter's box, the AI may provide statistical information on the matchup between Pitcher A and Batter B at a request from a betting participant.

The "statistical information" may include one or more of a statistical value and a prediction value for the current pitcher-batter matchup, the statistical value may be calculated based on one or more of past match data for the home team, the away team, the players of each team participating in the matchup, and past match data for the current pitcher-batter matchup, and the prediction value may be calculated based on one or more of the number of past betting hits by betting participants, the number of current bets by betting participants, and past match data for events (items) occurring in the current pitcher-batter matchup.

In addition, the AI statistics unit 350 may provide statistics on betting participation rates of betting participants, hit rates of betting participants, and the number of betting participants.

In other words, in the case of an event of simply predicting the occurrence or non-occurrence of a specific event, such as a hit, in the current inning, the hit rate will be very high (i.e., the probability that at least one hit occurs is higher than the probability that no hit occurs during each inning), so the specific occurrence type of the specific event may be offered as a betting event to increase the fun and suspense of betting.

Next, the reward unit 360 may be configured to reward a corresponding prize or reward based on the summed points of the bets based on the outcome of the current pitcher-batter matchup in each inning of the game.

For reference, the baseball game betting service server 300 disclosed herein may employ a deep learning algorithm, and the deep learning algorithm may include a deep belief network, an autoencoder, a convolutional neural network (CNN), a recurrent neural network (RNN), a deep Q-network, and/or the like. The deep learning algorithms listed herein are illustrative, and not limited thereto.

In the present disclosure, the Convolutional Neural Network (CNN), one of the aforementioned deep learning algorithms, may be applied to predict a baseball match event. The present disclosure is not limited thereto, and various other types of deep learning algorithms may be employed at the option of the user.

Figure 6:
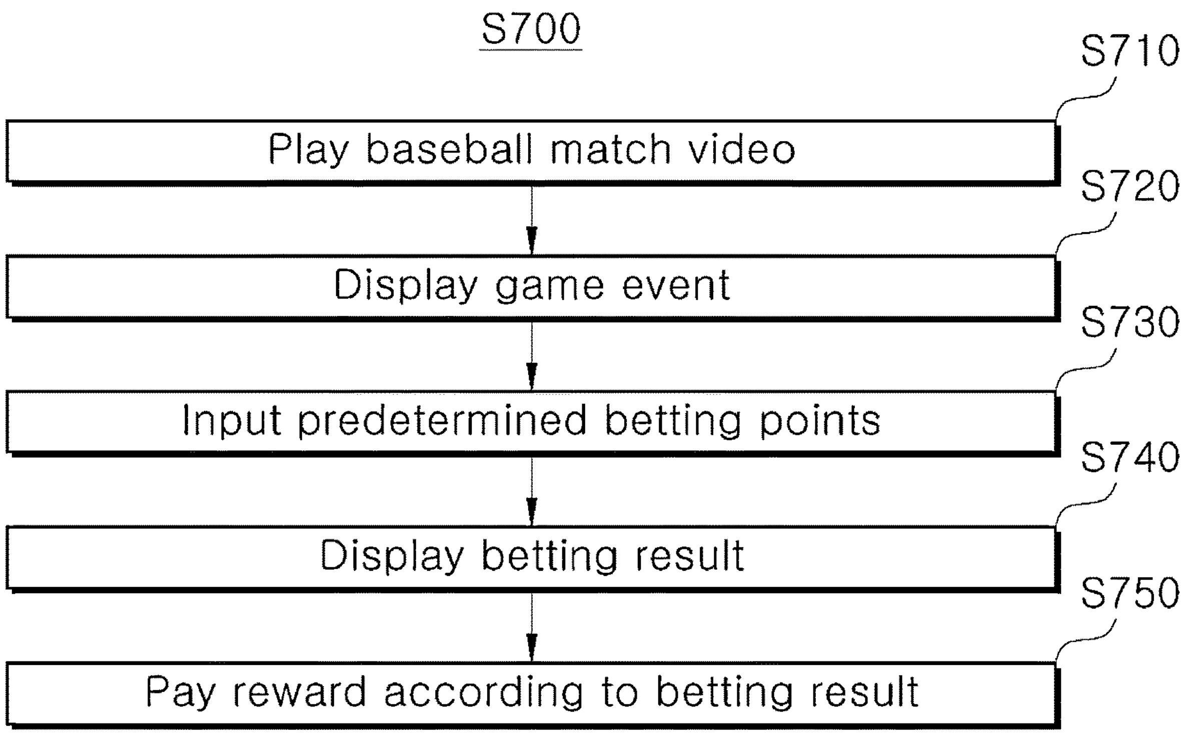
FIG. 6 is a flow chart for describing a method of providing a real-time baseball betting service according to an embodiment of the present disclosure.

FIG. 6 is a flow chart for describing a method for supporting a real-time baseball betting service according to an embodiment of the present disclosure.

Referring to FIG. 6, a method (S700) for providing a real-time baseball betting service according to an embodiment of the present disclosure may include executing, by the user terminal 200, a real-time baseball game betting service platform 10 and, if a desired baseball match video is played (S710), displaying, by the user terminal, at least one game event (S720) for the outcome of a matchup between a pitcher and a batter in each inning.

Operation S720 may include providing 'statistical information' to increase a betting hit when a betting participant selects a betting event in the current pitcher-batter matchup.

Subsequently, the user may input predetermined betting points for any of the at least one game event that is the outcome of the pitcher-batter matchup for each inning under preset betting conditions (S730).

The preset betting conditions may be 'betting time' for selecting a betting event, 'game time', and 'type of game event' to select the game event, wherein the betting time may be a time period from a time when the current batter strikes out or leaves the batter's box to a time when the next batter come to the batter's box, and the 'game time' for monitoring a betting result after the betting time has elapsed may be a time period from the time when the current batter comes to the batter's box to a time when the batter leaves the batter's box.

Furthermore, 'types of game events' may include, as the result of a batter's attack, five instances; (1) when it is ruled safe by the umpire at first base, (2) when it is ruled safe by the umpire at second base, (3) when it is ruled safe by the umpire at third base, (4) when a safe call for home run is made by the umpire at home, (5) when the base is not advanced and the umpire calls the player out, the game event betting on the batter being limited to the 5 cases, and in the present disclosure, the conditions mentioned are only examples and may be added or subtracted depending on the situation.

For reference, the following betting rules may be applied.

When a user selects a participating match and logs in using the above method, default points of 10,000 points may be awarded.

For every batter who comes to bat, regardless of the team, the user will register a bet by selecting the expected outcome of the attack for 100 points once.

By repeatedly performing the above-described operation, the user may place 100 points for every batter, regardless of team, from the first batter in the top of the first inning to the bottom of the 9th inning that is the regular inning, or until the match goes into extra innings and the last batter bats.

Even before the end of the regular inning at the bottom of the 9th inning, if there are many batters (if a lot of points are scored) and the number of points available for betting exceeds 10,000, no more points will be given for betting. This means that the game may be played within 10,000 points.

In ensuring that the points obtained as a result of bets are evenly distributed, any points with less than one decimal point are rounded up and there are no points with less than one decimal point.

The user's participation in the game does not necessarily have to start from the first batter of the first inning and the user may end the game at any time before the end of the game.

At the end of the game, the settled points of the user are automatically stored in the baseball game betting service server and the user terminal.

Operation S730 may further include selecting, by the user terminal, a reverse betting service that enables the user to bet on whether the betting probability of a plurality of betting participants is less than or equal to or is greater than or equal to a preset value.

After operation S730, the user terminal may display betting results based on the outcome of the pitcher-batter matchup for each inning (S740).

When the match result is over, the betting points of the betting results of the user's bets on the pitcher, batter, and defensive players for each inning are summed up, and a prize or reward corresponding to the summed points are awarded (S750).

Thus, using the system and method for providing a real-time baseball betting service according to an embodiment of the present disclosure, users are given an opportunity to place bets on various events that occur during the course of a baseball match, thereby increasing the focus and interest in the baseball match from the beginning to the end of the match.

Furthermore, even participants who do not have experience in analyzing a specific team or player may be provided with information that the participants are able to refer to when placing their bets, further increasing their interest in the betting game as well as their interest and excitement in the baseball match.

The effects of the present disclosure are not limited to the above effects, but are to be understood to include all effects that can be deduced from the detailed description of the invention or from the composition of the invention as recited in the claims.

The "unit" described in the embodiment of the present disclosure may be implemented with hardware components and software components and/or a combination of the hardware components and the software components. For example, the apparatus and components described in the embodiments may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of executing and responding to instructions. The processing device may run an operating system (OS) and one or more software applications that run on the OS.

The processing device also may access, store, manipulate, process, and create data in response to execution of the software. For convenience of understanding, one processing device is described as being used, but those skilled in the art will appreciate that the processing device includes a plurality of processing elements and/or multiple types of processing elements. For example, the processing device may include multiple processors or a single processor and a single controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the inventive concept, or they may be of the kind well-known and available to those having skill in the computer software arts. Examples of computer readable recording media include magnetic media such as hard disks, floppy disks and magnetic tape, optical media such as CD-ROMs, DVDs, and magnetic disks such as floppy disks, Magneto-optical media, and hardware devices specifically configured to store and execute program instructions, such as ROM, RAM, flash memory, and the like. Examples of program instructions include not only machine code generated by a compiler, but also high-level language code that can be executed by a computer using an interpreter or the like. The hardware device described above may be configured to operate as one or more software modules to perform the operations of the present disclosure, and vice versa.

Various modifications and variations may be made from the above description without departing from the essential characteristics of the present disclosure by those skilled in the art to which the present disclosure pertains. Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The system and method for providing a real-time baseball betting service according to an embodiment of the present disclosure may provide an opportunity to place bets on various events that occur during the course of a baseball match, thereby increasing the concentration and interest in the baseball match from the beginning to the end of the match.

Furthermore, it is possible to provide even participants who do not have experience in analyzing a specific team or player with information that they are able to refer to when placing their bets, further increasing their interest in the betting game as well as their interest and excitement in the baseball match.

The effects of the present disclosure are not limited to the above effects, but are to be understood to include all effects that can be deduced from the detailed description of the invention or from the composition of the invention as recited in the claims of the patent.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A system for supporting a real-time baseball betting service comprising:

a user terminal configured to, via a real-time baseball betting service platform, bet a specified amount of game money on a predicted outcome of a game event occurring during each inning of a live broadcast baseball match using a predetermined amount of game money which is paid per match; and a baseball game betting service server configured to directly or indirectly allow and/or prevent the user terminal from participating in a betting process according to a preset game betting rule, and pay a predetermined reward to the user terminal based on a cumulative sum of results of betting in which the user terminal participates in at least one of the game events occurring during each inning, wherein the baseball game betting service server is further configured to:

automatically record inning videos for particular innings of the live broadcast baseball match, wherein the particular innings are innings on which a betting participant places a bet;

detect objects in the inning videos, wherein the objects include a ball and a gesture of an umpire;

determine outcomes of the game events based on positions of the detected objects, wherein the game events include a single, a double, a triple, and a home run; and automatically record betting result videos for particular moments of occurrences of matching of the determined outcomes with the bet placed by the betting participant.

2. The system of claim 1, wherein the baseball game betting service server is configured to support game betting on one or more baseball match broadcasts currently being played and on possible game events in each inning of each baseball match, for each pitcher, batter and defensive player within a betting time, wherein the betting time for the pitcher is a time period from a time when a batter enters a batter's box to a time when the pitcher takes a set position to pitch (the pitcher places his axial foot facing the batter fully on or in front of a pitching plate, making contact with the pitching plate without separating from it, and then places his other foot in front of the pitching plate, holding a ball with both hands in front of his body, and completely stops moving for at least one second), and wherein the betting time of the batter and the defensive player is a time period from a time when a current batter strikes out or leaves the batter's box to a time when a next batter in order enters the batter's box.

3. The system of claim 2, wherein the baseball game betting service server is configured to recognize a batter batting only when any one of five batting conditions input by the user terminal is satisfied, wherein the five batting conditions include (1) a case where it is ruled safe by umpires at first base, (2) a case where it is ruled safe by umpires at second base, (3) a case where it is ruled safe by umpires at third base, (4) a case where a safe call for home run is made by umpires at home, (5) a case where base is not advanced and umpires call a player out.

4. The system of claim 1, wherein the baseball game betting service server is configured to sum up betting points of participants who failed to bet among betting points on result of a batter's attack and then distribute summed betting points evenly.

5. The system of claim 4, wherein the baseball game betting service server is configured to provide statistics on past matchups between a pitcher and a batter (winning percentage, batting average, or strikeout probability).

6. The system of claim 5, wherein the baseball game betting service server is configured to supports results of bets on results of defensive play of defensive players when a batter hits, and wherein the user terminal is configured to place a bet on a defensive player who first catches a hit or bunted ball, including a foul fly ball, to get the batter out, or catches and throws or tosses the ball to a fellow defensive player, in response to the batter's batting, from among nine defensive players including the pitcher.

7. A method for providing a real-time baseball betting service comprising:

executing, by a user terminal, a real-time baseball game betting service platform and playing a desired baseball match video;

displaying, by the user terminal, a result of a matchup between a pitcher and a batter for each inning and at least one game event about a defensive player;

inputting, by the user terminal, preset betting points for at least one of game events related to a pitcher, batter, and defensive player for each inning under preset betting conditions;

displaying, by the user terminal, betting results according to results of the game events related to the pitcher, the batter, and the defensive player; and when the game results are over, summing up betting points for the betting results of a user's bets on the pitcher and batter for each inning and then paying a prize or reward corresponding to summed points, wherein the executing comprises:

automatically recording inning videos for particular innings of a live broadcast baseball match, wherein the particular innings are innings on which a betting participant places a bet;

detecting objects in the inning videos, wherein the objects include a ball and a gesture of an umpire;

determining outcomes of the game events based on positions of the detected objects, wherein the game events include a single, a double, a triple, and a home run; and automatically recording betting result videos for particular moments of occurrences of matching of the determined outcomes with the bet placed by the betting participant.

* * * * *